US008810904B2

(12) United States Patent
Jacobsen (10) Patent No.: US 8,810,904 B2
(45) Date of Patent: Aug. 19, 2014

(54) OPTICAL CONTACT MICROMETER (75) Inventor: Steven D. Jacobsen, Evanston, IL (US)

(73) Assignee: Northwestern University, Evanston, IL (US)

( * ) Notice: Subject to any disclaimer, the term of this patent is extended or adjusted under 35 U.S.C. 154(b) by 240 days.

(21) Appl. No.: 13/369,851

(22) Filed: Feb. 9, 2012

(65) Prior Publication Data

US 2012/0206797 A1    Aug. 16, 2012

Related U.S. Application Data (60) Provisional application No. 61/441,086, filed on Feb. 9, 2011.

(51) Int. Cl.
G02B 21/00 (2006.01)
G01B 17/02 (2006.01)
G01H 9/00 (2006.01)

(52) U.S. Cl.
CPC . *G01B 17/02* (2013.01); *G01H 9/00* (2013.01)
USPC .......................................... 359/370; 356/450

(58) Field of Classification Search
USPC ............................ 359/370; 356/400, 450, 496
See application file for complete search history.

(56) References Cited

U.S. PATENT DOCUMENTS

| 4,537,509 A * | 8/1985 | Kronfeld ................... 356/399 |
| 6,108,090 A * | 8/2000 | Ishihara ................... 356/601 |
| 6,970,252 B2 * | 11/2005 | Knuttel ................... 356/497 |
| 7,230,721 B2 * | 6/2007 | Christoph ................ 356/601 |
| 7,715,025 B2 * | 5/2010 | Iwamoto ................. 356/614 |
| 8,248,593 B2 * | 8/2012 | Yamauchi et al. ......... 356/237.2 |
| 2011/0043822 A1 * | 2/2011 | Hamano et al. ............ 356/515 |
| 2012/0095723 A1 * | 4/2012 | Bobasheva et al. ........ 702/145 |

* cited by examiner

*Primary Examiner* — Frank Font
(74) *Attorney, Agent, or Firm* — Hanley, Flight and Zimmerman, LLC (57) ABSTRACT Certain examples provide optical contact micrometers and methods of use. An example optical contact micrometer includes a pair of opposable lenses to receive an object and immobilize the object in a position. The example optical contact micrometer includes a pair of opposable mirrors positioned with respect to the pair of lenses to facilitate viewing of the object through the lenses. The example optical contact micrometer includes a microscope to facilitate viewing of the object through the lenses via the mirrors; and an interferometer to obtain one or more measurements of the object.

20 Claims, 7 Drawing Sheets

FIG. 7

OPTICAL CONTACT MICROMETER

CROSS-REFERENCE TO RELATED APPLICATIONS

This patent claims priority to U.S. Provisional Application Ser. No. 61/441,086, entitled "Optical Contact Micrometer," which was filed on Feb. 9, 2011 and is hereby incorporated herein by reference in its entirety.

STATEMENT REGARDING FEDERALLY SPONSORED RESEARCH OR DEVELOPMENT

This invention was made with government support under EAR0748707 awarded by National Science Foundation and DE-FC52-08NA28554 by Department of Energy (Subcontract Number 4-3253-03, Carnegie Institution of Washington). The government has certain rights in the invention.

BACKGROUND

Elastic constants (Cij) relate stress to strain in materials and represent a fundamental property controlled ultimately at the atomic scale by interatomic bonding forces. Engineers rely on precise elastic moduli to calculate the stiffness of model designs. Materials scientists design new materials to achieve desired elastic properties for many basic and applied sciences. Geophysicists use the elastic properties of minerals at high pressures and temperatures to reveal the constitution of Earth's interior from three-dimensional images of seismic wave velocities. These, among other applications, involve precision measurements of elastic properties of materials.

The following detailed description of certain embodiments will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF CERTAIN EXAMPLES

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components can be embodied exclusively in hardware, exclusively in software, exclusively in firmware, or in any combination of hardware, software, and/or firmware.

Accordingly, while the following describes example methods, systems, articles of manufacture, and apparatus, the examples provided are not the only way to implement such methods, systems, articles of manufacture, and apparatus.

When any of the appended claims are read to cover a purely software and/or firmware implementation, in at least one example, at least one of the elements is hereby expressly defined to include a tangible medium such as a memory, DVD, CD, Blu-ray, etc. storing the software and/or firmware.

Overview

Certain examples provide an optical contact micrometer. The optical contact micrometer combines benefits of a contact micrometer with precision of an optical interferometer. By hybridizing these two length-measurement techniques, certain examples provide a double-contact micrometer with points a user can "look through" from both sides. By employing hard hemispheres as contact lenses, spatial resolution is on an order of 50 micrometers (and potentially higher resolution with automated mapping), for example. By interfacing the instrument with any commercially available heterodyne interferometer, a precision of ±0.05 micrometers in thickness, for example, is achieved (approximately 20-times better than standard micrometers).

The optical contact micrometer can be used to determine thickness of samples in ultrasonic measurements of material elastic properties and can also be used as a research tool in nano-metrology, materials characterization, and industrial quality control, for example.

Brief Description

Certain examples provide an optical contact micrometer including a pair of opposable lenses to receive an object and immobilize the object in a position; a pair of opposable mirrors positioned with respect to the pair of lenses to facilitate viewing of the object through the lenses; a microscope to facilitate viewing of the object through the lenses via the mirrors; and an interferometer to obtain one or more measurements of the object.

Certain examples provide a method of object measurement including facilitating positioning of an object between a pair of movable lenses at a desired position and angle; enabling viewing of the object via the pair of lenses and one or more mirrors; facilitating acquisition of at least one measurement of the object using an optical measurement device; and providing an output based on the measurement.

Certain examples provide an optical contact micrometer including a pair of lenses to receive an object and immobilize the object in a position. The pair of lenses is to be positioned on opposite sides of an opening to receive the object. The pair of lenses includes a movable lens and a fixed lens. The movable lens contacts the object to immobilize the object against the fixed lens. The example optical contact micrometer also includes a pair of opposable mirrors positioned at an angle with respect to the pair of lenses to facilitate viewing of the object through the lenses. The example optical contact micrometer further includes a microscope to facilitate viewing of the object through the lenses via the mirrors and a laser interferometer to obtain one or more measurements of the object.

Description of Certain Examples

Certain examples measure a length and/or thickness of solid parts (e.g., tools, gauge blocks, scientific samples, etc.) at a specific location on a part chosen optically by a user. Certain examples allow a user to look through contact points to examine and choose precisely where the thickness measurement is made on the part under test. By interfacing the optical contact micrometer with a commercial laser interferometer, such as a heterodyne double-pass interferometer, the contacting thickness measurement can achieve optical precision of ±0.05 micrometer or better, compared with ±1.0 micrometer precision offered by existing non-optical micrometers, which also lack determination of the measurement point.

Certain examples utilize a small contact area made between two hard spheres, which also act as optical lenses, hereafter referred to as "contact lenses". The contact lenses can be of any material and size optimized or otherwise targeted for the application. In certain examples, sapphire contact lenses are used for superhard materials testing, and fused silica can be employed when it is desirable to reduce or minimize thermal expansivity of the system. A pair of lenses with appropriate shape, size, and material is fixed to a linear translation stage by invar alloys, which also reduce or minimize thermal expansivity of the system. A linear translation stage is open by a manual micrometer drive, and retraction of the stage is accomplished by an adjustable spring to allow different forces of contact, depending on the nature of a sample being measured.

A closed position is initialized as zero length. Once open, a sample is inserted, and the lens pair is closed on the sample. When the sample is mounted on a flexible wire or fiber, the sample aligns itself between the hard spheres. One sphere is fixed, while the other is driven by the micrometer. The moveable sphere is attached to a plane mirror, which is tracked by a heterodyne interferometer to readout an absolute thickness of the part or sample with optical precision.

As an example application, the optical contact micrometer can be used to determine the thickness of polished mineral plates used in scientific experiments of material elastic properties. Ultrasonic measurements of sound wave travel times use thickness in calculation of elastic wave velocities, which determine an elastic tensor of materials—a fundamental property of every material relating stress to strain. In this example, ultrasonic measurements of diamond in conjunction with new length measurements using the optical contact micrometer improve uncertainties in diamond elastic properties by about one order of magnitude over previous ultrasonic studies. The elastic properties of diamond and other hard materials are important to many applications in science and technology.

Other applications include nano-metrology, material properties testing, research, and industrial quality control, for example.

Elastic constants ($C_{ij}$) relate stress to strain in materials and represent a fundamental property controlled ultimately at the atomic scale by interatomic bonding forces. Engineers rely on precise elastic moduli to calculate the stiffness of model designs. Materials scientists design new materials to achieve desired elastic properties for many basic and applied sciences. Geophysicists use the elastic properties of minerals at high pressures and temperatures to reveal the constitution of Earth's interior from three-dimensional images of seismic wave velocities. These, among other applications involve precision measurements of elastic properties of materials.

In certain examples, a high-frequency (GHz) ultrasonic interferometer can be combined with a precision sample-length measuring optical micrometer to determine fundamental elastic constants of challenging but essential solids such as diamond and related materials. In certain examples, a target precision is ±1 GPa or better out of 1000 GPa, which is approximately the Young's modulus of diamond.

Diamond

Diamond has long fascinated science and society alike for its remarkable hardness. In addition to being admired for its beauty, diamond is an essential material in science and engineering, whether as a resilient semi-conducting substrate in future electronics, as superhard and transparent anvils in high-pressure devices, or within the hohlraum assembly of fusion experiments at the National Ignition Facility, the elastic properties of diamond at ambient and extreme conditions are needed in many areas of scientific innovation. Despite a long history of measurements, the elastic constants of diamond are arguably not precisely known (see Table 1 below). It is not clear whether reported variability in the elastic constants of diamond results from misrepresented measurement uncertainties, or because the properties of individual diamonds vary because of different defect structures. Synthesis of new forms of diamond ranging from chemical vapor deposition (CVD) to nanopolycrystalline diamond calls into question whether or not a superior diamond can be created, and how it would be recognized. Precision elastic constants are needed for a myriad of new materials to quantitatively assess their future technological potential.

TABLE 1

| | | | | | | | |
|---|---|---|---|---|---|---|---|
| | | Elastic constants of diamond | | | | | |
| Technique/<br>Sample/Reference | $C_{11}$(GPa) | $C_{12}$(GPa) | $C_{44}$(GPa) | Density<br>(kg · m$^{-3}$) | Bulk<br>Modulus,<br>K (GPa) | Shear<br>Modulus,<br>μ (GPa) | Young's<br>Modulus,<br>$E_{11}$ (GPa) |
| MHz-Ultrasonic Interferometry Natural Type-1A single crystal McSkimin and Andreatch (1972) | 1079 ± 5 | 124 ± 5 | 578 ± 2 | 3512 | 442 ± 5 | 536 ± 3 | 1053 ± 14 |
| Brillouin Scattering Natural Type-1A single crystal Grimsditch and Ramdas (1975) | 1076.4 ± 0.2 | 125 ± 2 | 577 ± 1 | 3512 | 442 ± 2 | 534 ± 1 | 1050 ± 4 |

TABLE 1-continued

Elastic constants of diamond

| Technique/Sample/Reference | $C_{11}$(GPa) | $C_{12}$(GPa) | $C_{44}$(GPa) | Density (kg·m$^{-3}$) | Bulk Modulus, K (GPa) | Shear Modulus, µ (GPa) | Young's Modulus, $E_{11}$ (GPa) |
|---|---|---|---|---|---|---|---|
| Brillouin Scattering CVD polycrystal Jiang et al. (1991) | 1062 ± 74 | 122 ± 8 | 541 ± 22 | 3510 | 435 ± 30 | 511 ± 30 | 1037 ± 90 |
| Ultrasonic phase velocity Synthetic single-crystal 0.0% $^{13}$C Hurley et al. (1994) | 1094 ± 9 | 125 ± 1 | 589 ± 5 | 3557 ± 15 | 448 ± 4 | 545 ± 5 | 1068 ± 11 |
| Ultrasonic phase velocity Synthetic single-crystal 99.0% $^{13}$C Hurley et al. (1994) | 1095 ± 9 | 238 ± 2 | 582 ± 5 | 3730 ± 40 | 524 ± 4 | 515 ± 5 | 1010 ± 13 |
| Brillouin Scattering Synthetic single-crystal 10.0% $^{13}$C Vogelgesang et al. (1996) | 1079.9 ± 0.5 | 125 ± 1 | 578.3 ± 0.5 | 3512 | 443.3 ± 0.8 | 535.6 ± 0.6 | 1054 ± 2 |
| Brillouin Scattering Synthetic single-crystal 99.0% $^{13}$C Vogelgesang et al. (1994) | 1079.2 ± 0.7 | 125 ± 1 | 577.6 ± 0.7 | 3802 | 443.1 ± 0.9 | 535.1 ± 0.8 | 1053 ± 3 |
| Line-focus acoustic microscopy Natural Type-1A Tourlog et al. (1996) | 1029 | 238 | 527 | 3512 | 502 | 470 | 940 |
| Brillouin Scattering CVD Single-crystal Djemia et al. (2007) | 1160 ± 4 | 256 ± 8 | 616 ± 2 | 3550 | 557 ± 7 | 544 ± 4 | 1067 ± 18 |

In certain examples, GHz-ultrasonic interferometry is applied to determine the elastic constants of many different forms of natural diamond and related materials now under development at many different institutions and industry. The GHz-technique, like other ultrasonic methods uses pulse-echo delay lines to interfere echoes from two sides of a parallel-plate sample. Unlike other ultrasonic methods, GHz-ultrasonics drives custom ZnO thin-film transducers at 1-2 GHz, creating sound waves with near-optical wavelength and, therefore, allows measurement of acoustic travel times in sub-millimeter samples. Many of the newly designed super-hard materials grown at high pressure are only available in sub-millimeter sizes. Unlike Brillouin spectroscopy, GHz-ultrasonic interferometry does not rely on particular optical properties of the sample. Because sound waves in diamond travel at over 17 kilometers per second, it only takes about 12 nanoseconds for elastic waves to traverse a 100-µm diamond film. Acoustic wavelengths at 1-2 GHz are in the micron range, making the technique ideal for micro-samples or nano-materials with crystallites <100 nm. In addition, the GHz-system can interface with diamond-anvil cells (see FIG. 1), which allows determination of equations of state at pressures up to 10 GPa, and possibly much higher.

Whereas the GHz-ultrasonic technique can measure acoustic wave travel times with a precision of a few parts in $10^4$, length measurement of microsamples has limited precision in sound velocities or elastic constants because micrometers can only achieve thickness measurements to within a few micrometers. In certain examples, thickness measurements are obtained using an optical contact micrometer. The optical contact micrometer takes advantage of the small contact area between two spheres, which also act as optical lenses. A laser heterodyne interferometer tracks linear motion of a back of one hemispherical lens, which also acts as a contact point of the optical micrometer. The laser wavelength is corrected for air temperature, pressure, and humidity in real time (or substantially real time). By placing a sample between the lenses, thickness is determined at a precise location on the sample where the ultrasonic travel-time measurements were made. Using the optical contact micrometer, thickness measurement tests on thick diamond plates have achieved precision of ±0.02 µm based upon a standard deviation of 20-30 thickness measurements. With this precision, the uncertainty in diamond elastic constants can be reduced to ±1 GPa or better out of 1000, allowing scrutiny of the elastic constants of diamond and determination of $C_{ij}$ for new superhard materials targeted for future scientific and technological applications.

Figure 1:
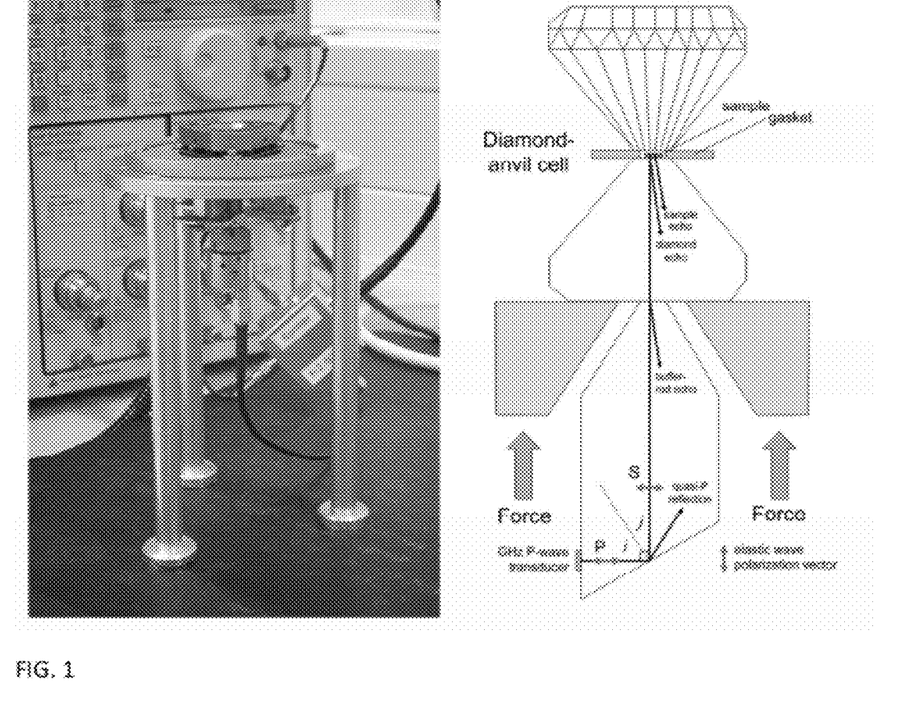
FIG. 1 illustrates an example GHz-ultrasonic interferometry interfaced with a diamond-anvil cell for elastic properties measurements at high pressures.

FIG. 1 illustrates an example GHz-ultrasonic interferometry interfaced with a diamond-anvil cell for elastic properties measurements at high pressures. FIG. 1 shows a shear-wave configuration, where a P-wave generated from a ZnO thin-film transducer is converted to an S-wave by internal reflection inside an acoustic prism. Precision of travel-time measurements is determined by spacing between pairs of maxima and minima in an acoustic interferrogram. Typical precision of GHz-wave travel-time measurements is on the order of ±0.02 nanosecond (ns) out of 50-100 ns for a sample measuring less than 1 millimeter (mm).

Cubic Boron Nitride

Additionally, as a superhard material with properties similar to diamond, including chemical inertness, cubic boron nitride (cBN) is an excellent candidate as a pressure calibration standard for high-temperature high-pressure research using its pressure-volume-temperature (PVT) equation of state. However, the elastic properties of cBN at room conditions are known only within broad bounds. Single-crystal elastic properties of cBN have been measured with high precision and accuracy to resolve discrepancies among existing data sets and theoretical calculations. Values of $C_{11}=798.4\pm1.7$ GPa, $C_{44}=469.0\pm1.0$ GPa, $C_{12}=172.4\pm1.1$ GPa, from which an isotropic aggregate bulk modulus Ks=381.1±1.3 GPa and shear modulus G=398.78±1.2 GPa (Hill average) are calculated. Results resolve discrepancies in reported values and improve precision and accuracy with which the elastic properties of cBN are known.

Cubic boron nitride (cBN), which is isostructual with diamond, exhibits many desirable properties, such as high melting temperature, high thermal conductivity, and chemical stability over a wide range of pressures and temperatures. A thermal equation of state for cBN and properties at high pressures and temperatures have been measured using a variety of methods (e.g., Raman spectroscopy, synchrotron X-ray diffraction, and Brillouin scattering). The determined properties of cBN indicate that it is an excellent candidate for pressure calibration in simultaneous high-temperature high-pressure experiments using the diamond-anvil cell (DAC).

In certain examples, an optical contact micrometer can be used to produce a standard-thickness material (e.g., pure silica glass) with velocities measured by GHz-ultrasonic interferometry. The standard-thickness material is then used to calibrate spectrometer (e.g., a Brillouin spectrometer) such that (Brillouin) spectroscopy can be used to measure the $C_{ij}$ of cBN with high accuracy.

For example, a plate of fused silica is polished, and compressional and shear-wave acoustic travel times through the silica plate are measured with GHz-ultrasonics. Then, the thickness of the fused silica glass plate is measured in an exact location of the ultrasonic measurements, using the optical contact micrometer. In the example, the thickness is determined to be 0.99921(5) mm, where the number in parentheses is one standard deviation in the last place (e.g., plus-minus 0.05 microns). The thickness measurement is used to determine compressional (Vp) and shear (Vs) velocities of the glass with less than 1 m/s error: Vp=5905.5(0.8) m/s and Vs=3755.9(+/−0.6) m/s. By placing this "standard" sample in the Brillouin spectrometer, an angle of scattering can be calibrated to within a hundredth of a degree, which results in very high accuracy measurements of the elastic constants of cBN.

Optical Contact Micrometer

In certain examples, an optical contact micrometer can be interfaced with laser interferometers. Applications include three-dimensional mapping of industrial parts thickness with in-situ optical information of part. Applications also include scientific experiments involving knowledge of sample thickness. For example, ultrasonic testing requires thickness information to obtain sound velocities from travel-time measurements. Using the example optical contact micrometer, one can improve by an order of magnitude an uncertainty in elastic constants of materials.

Using the optical contact micrometer, a contact point can be viewed optically. This allows thickness measurements of opaque materials that are not transparent to laser interferometers, for example. Certain examples take advantage of the precision of optical interferometers by interfacing a new optical contact micrometer with a laser interferometer and adding an optical confirmation of a thickness measurement position. Certain examples provide a hybrid between laser interferometer and mechanical contact micrometer, which has not been assembled or tested before. Capabilities are demonstrated by measuring the thickness of an opaque (ceramic) 1.0 millimeter gauge block at a specific location determined visually, measured by contact between hard spheres, and tracked optically by a commercial laser heterodyne to achieve better than ±0.05 micrometers uncertainty. A thickness of a part can vary greatly and still be measured, and any part greater than about 50 micrometers area dimensions can be inserted between spheres for thickness measurements. An adjustable spring allows a user to control the force of contact, in case the part under test is fragile.

Certain examples provide a high-frequency ultrasonic method to determine sound velocities and elastic constants of materials. Working at 1-2 GHz, for example, acoustic wavelengths in minerals and hard materials are reduced to 1-10 micrometers, allowing measurements on single crystals as small as 20-30 micrometers and without optical constraints. Such small crystals can be studied at ultra-high pressures inside diamond anvil cells, for example.

Although relative changes in acoustic wave travel times in materials on compression or heating are measured with standard deviation of about ±0.02 nanoseconds out of 20-200 ns (depending on sample thickness), an absolute accuracy of ultrasonic measurements at standard conditions, used to anchor future high pressure—temperature (P-T) measurements, has been limited by sample thickness measurements with only ±1-2 μm precision out of 20-200 μm for typical samples. A hybrid optical-mechanical displacement interferometer features a double-pass laser interferometer with λ/4 fundamental optical resolution and λ/128 (about 5 nm) system resolution through software-based interpolation. By adding real-time corrections for air temperature, humidity, and pressure applied to the laser wavelength, high accuracy with standard deviations of about ±0.02 micrometers in thickness is achieved. For purposes of illustration only, the $C_{11}$ and $C_{44}$ elastic constants of a natural type IA single-crystal diamond are re-determined with precision: $C_{11}$=1076.2(6) GPa and $C_{44}$=575.8(4) GPa, improving the reported uncertainty in moduli of diamond by about one order of magnitude over previous ultrasonic measurement. This technique allows users to ascertain whether or not reported variability in elastic properties various forms of synthetic diamond are significant. For example, the optical contact micrometer can be used to study both natural and synthetic diamond elasticity and variations in equations of state with defect structure and pressure, as well as other superhard materials targeted for use in societal applications.

Figure 2:
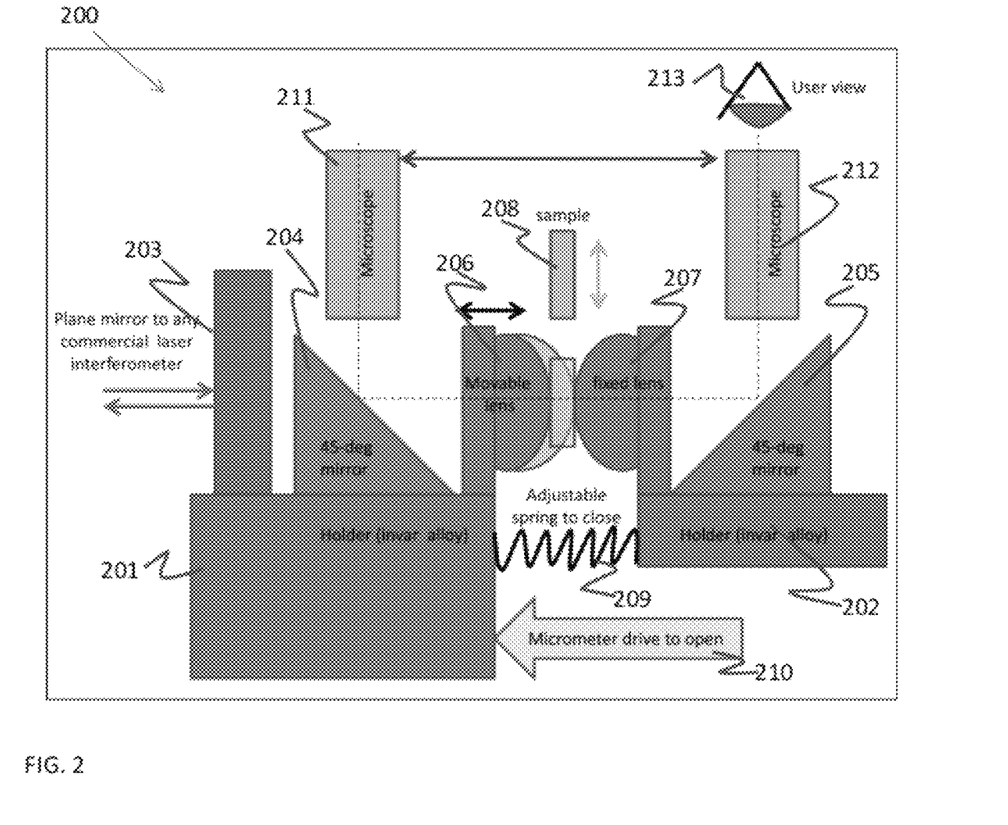
FIGS. 2-4 depict example optical contact micrometers.

FIG. 2 depicts an example optical contact micrometer 200. The micrometer 200 includes holders 201, 202 (e.g., invar alloy holders) to position a plurality of components in the micrometer 200. A plane mirror 203 serves as an interface between the micrometer 200 and a laser interferometer, for example. Two 45-degree mirrors 204, 205 are positioned with respect to a movable lens 206 and a fixed lens 207, between which a sample 208 can be positioned. An adjustable spring 209 can be used to close the movable lens 206 toward the fixed lens 207 to position the sample 208. A micrometer drive 210 (e.g., a manual or automated spherical spindle rotating drive) can be used to open or separate the movable lens 206 from the fixed lens 207. Microscope 211, 212 can then be used to provide a user view 213 of the sample 208 between the lenses 206, 207 using the mirrors 204, 205, for example.

Figure 3:
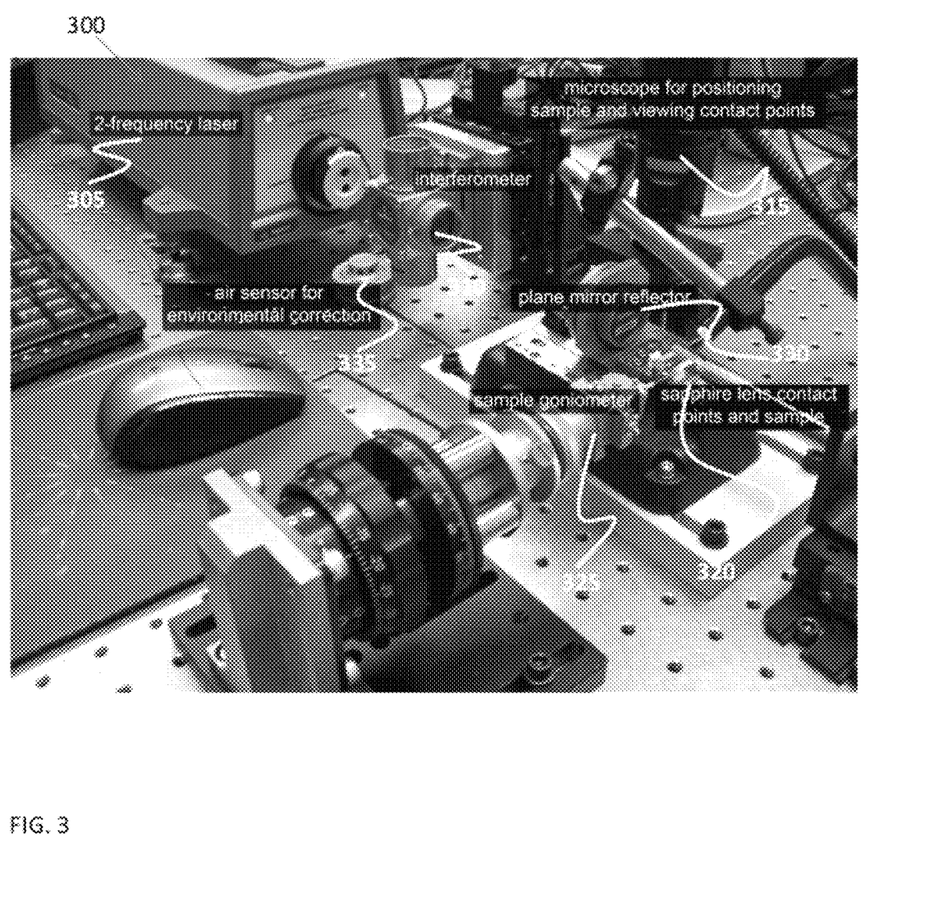

FIG. 3 shows another view of an example optical contact micrometer 300. The example micrometer 300 includes a dual frequency laser 305, an interferometer 310, and a microscope 315 to position sample and view contact points. Lens contact points 320 (e.g., sapphire lens contact points) allow positioning of a sample. A sample goniometer 325 allows the sample to be rotated to an angular position and can measure the angle of the sample as well. A plane mirror reflector 330 assists in user viewing of the sample via the lens 320 and microscope 315. An air sensor 335 can provide environmental correction.

Figure 4:
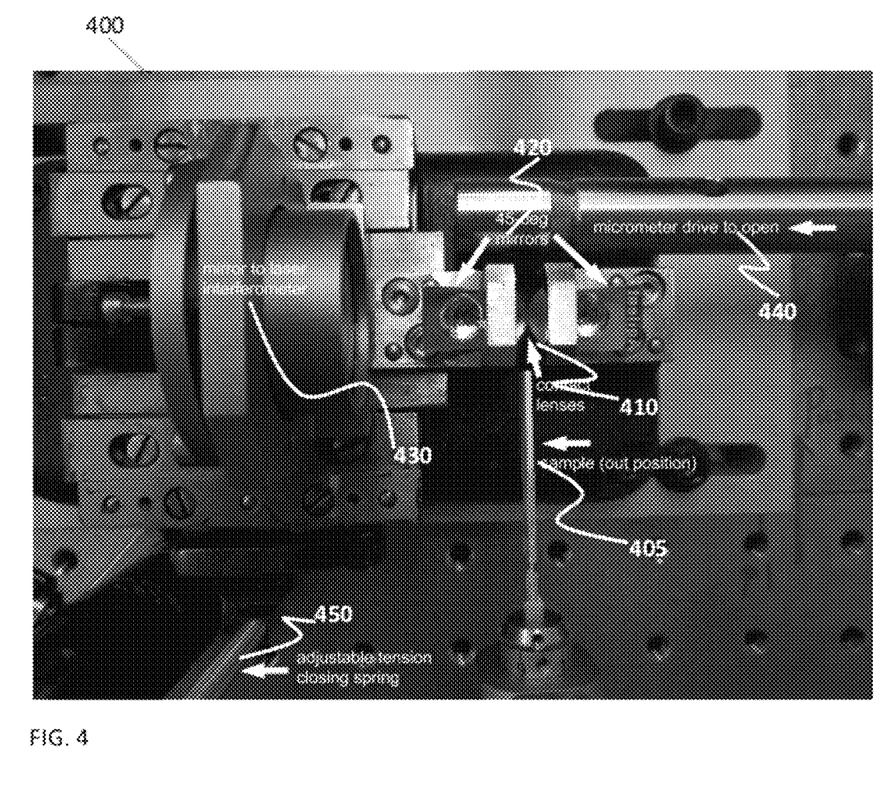

FIG. 4 provides another view of an example optical contact micrometer 400. The example micrometer 400 includes contact lenses 410 to position a sample 405 with respect to a pair of mirrors 420 (e.g., 45 degree mirrors) and a mirror to laser interferometer 430. A micrometer drive 440 opens the lenses 410 to position the sample 405. A tension closing spring 450 is adjustable to close the lenses for viewing of the sample 405.

Figure 5:
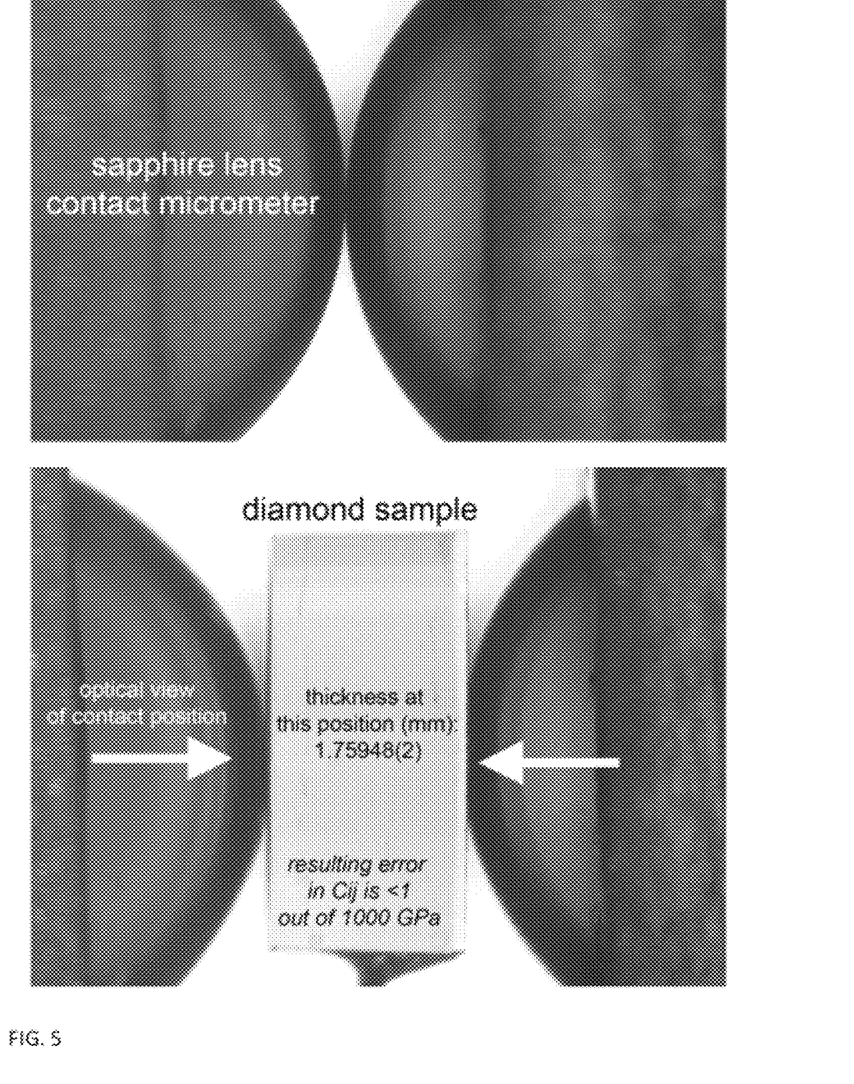
FIG. 5 shows example contact lenses with an example sample being measured.

FIG. 5 shows example contact lenses (e.g., sapphire) with an example synthetic diamond sample being measured. Thickness of diamond is measured and used to improve measured elastic constants ($C_{ij}$) from separate ultrasonic travel-time measurements.

Figure 6:
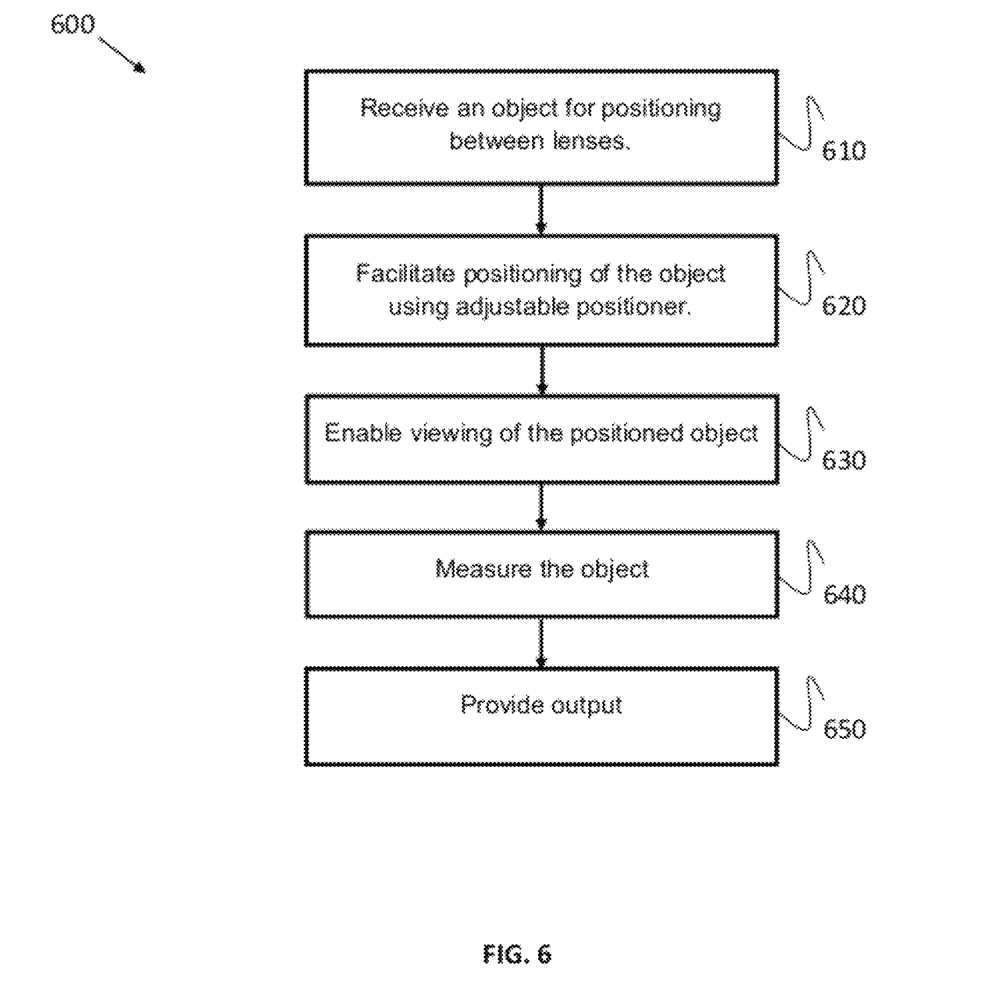
FIG. 6 illustrates a flow diagram for an example method for optical contact measurement of an object.

FIG. 6 illustrates a flow diagram for an example method 600 for optical contact measurement of an object. At block 610, an object is received between a pair of hard contact lenses. At block 620, positioning of the object is facilitated using an adjustable positioner. For example, a movable lens and a fixed lens controlled by an adjustable spring (e.g., manual and/or motorized) can be used to immobilize the object for viewing and measurement. An angular positioning device, such as a goniometer, can be used to angle the object between the lenses, for example.

At block 630, the positioned object can be viewed (e.g., by a human user or automated program) via mirrors affixed with respect to the positioning lenses. Viewing can be assisted using a microscope, for example. The mirrors can be positioned at an angle of 45 degrees with respect to the lenses, for example. The contact points (e.g., the lenses) holding the sample can be viewed and positioning verified using the microscope viewer, for example.

At block 640, the object is measured. For example, an interferometer (e.g., a laser interferometer driven by a multi-frequency laser) can measure (e.g., optically measure using the laser) the object. Properties of the returned or reflected beam from the object are measured upon receipt by the interferometer. For example, the interferometer fires a laser, which is reflected off the object and returns to the interferometer for measurement and/or other analysis. An air sensor may also be provided to facilitate correction to measurement based on environmental factors (e.g., air temperature, air pressure, relative humidity, etc.) affecting laser wavelength, for example. Using the interferometer, a variety of measurements can be obtained (e.g., angular, straightness, flatness, squareness, rotary axis, distance, dimension, etc.) using reflected light.

At block 650, output is provided to the user. Output can be used to determine satisfactory manufacture of the object, properties of the object, dimensions of the object, etc.

In certain examples, positioning, measurement and/or analysis can be automated using a processor to move the holder, trigger the laser interferometer, trigger the goniometer, measure, etc. A program and/or hardcoded system can be provided to automate and/or facilitate the automation of these processes.

Figure 7:
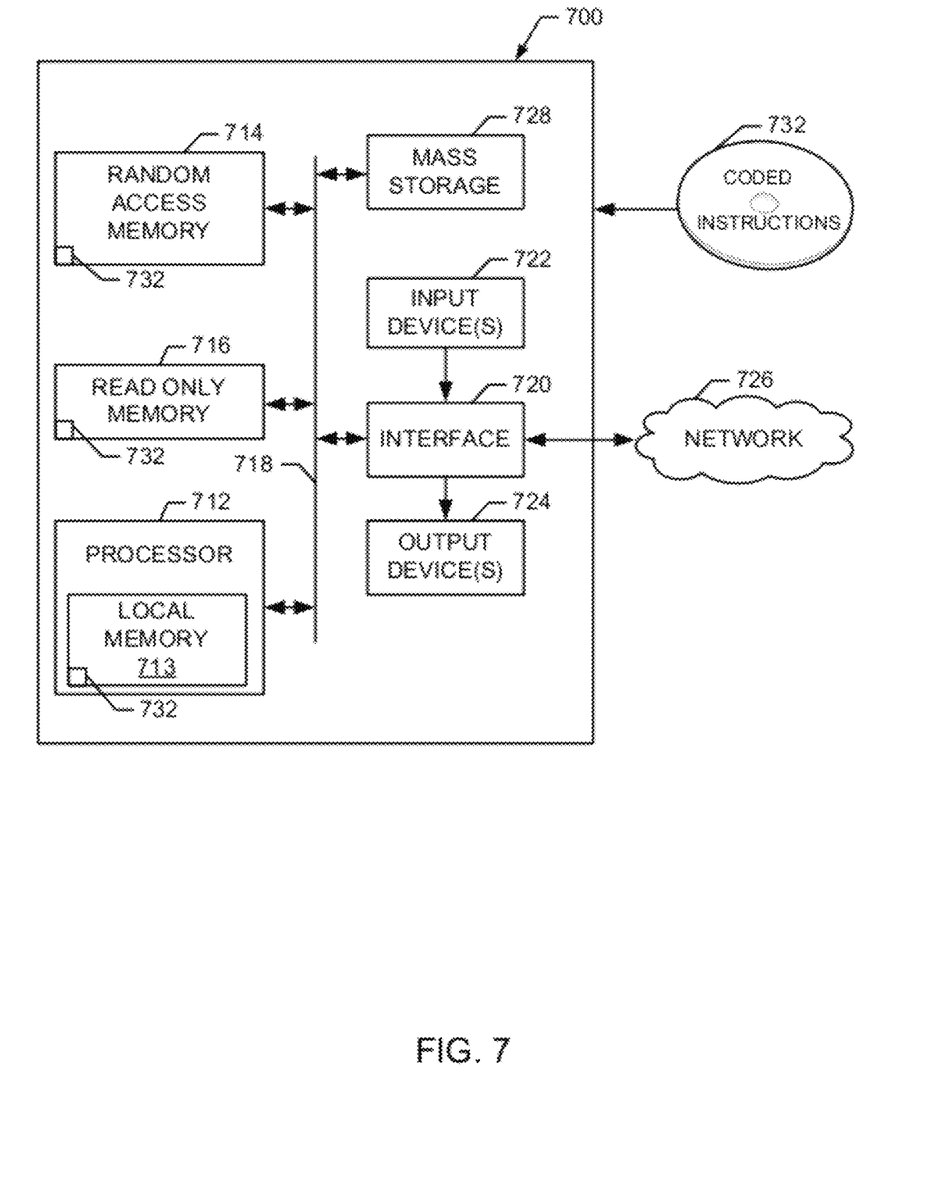
FIG. 7 is a block diagram of an example processor platform that may be used to execute and/or control systems, methods and apparatus described herein.

FIG. 7 is a block diagram of an example processor platform that may be used to execute and/or control systems, methods and apparatus described herein. The processor platform 700 of the instant example includes a processor 712. For example, the processor 712 can be implemented by one or more microprocessors or controllers from any desired family or manufacturer. The processor 712 includes a local memory 713 (e.g., a cache) and is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 also includes an interface circuit 720. The interface circuit 720 may be implemented by any type of interface standard, such as an Ethernet interface, a universal serial bus (USB), and/or a PCI express interface.

One or more input devices 722 are connected to the interface circuit 720. The input device(s) 722 permit a user to enter data and commands into the processor 712. The input device(s) can be implemented by, for example, a keyboard, a mouse, a touchscreen, a track-pad, a trackball, isopoint and/or a voice recognition system.

One or more output devices 724 are also connected to the interface circuit 720. The output devices 724 can be implemented, for example, by display devices (e.g., a liquid crystal display, a cathode ray tube display (CRT), etc.). The interface circuit 720, thus, typically includes a graphics driver card.

The interface circuit 720 also includes a communication device such as a modem or network interface card to facilitate exchange of data with external computers via a network 726 (e.g., an Ethernet connection, a digital subscriber line (DSL), a telephone line, coaxial cable, a cellular telephone system, etc.).

The processor platform 700 also includes one or more mass storage devices 728 for storing software and data. Examples of such mass storage devices 728 include floppy disk drives, hard drive disks, compact disk drives and digital versatile disk (DVD) drives. The mass storage device 728 may implement a local storage device.

The coded instructions 732 of FIG. 6 may be stored in the mass storage device 728, in the volatile memory 714, in the non-volatile memory 716, and/or on a removable storage medium such as a CD, Blu-Ray, or DVD.

Although certain example methods, systems, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An optical contact micrometer comprising:
 a pair of opposable lenses to receive an object and immobilize the object in a position;
 a pair of opposable mirrors positioned with respect to the pair of lenses to facilitate viewing of the object through the lenses;
 a microscope to facilitate viewing of the object through the lenses via the mirrors; and
 an interferometer to obtain one or more measurements of the object.

2. The micrometer of claim 1, wherein the pair of opposable lenses comprises a fixed lens and a movable lens.

3. The micrometer of claim 1, further comprising a goniometer to angularly position the object with respect to the pair of lenses.

4. The micrometer of claim 1, wherein the interferometer comprises a laser interferometer.

5. The micrometer of claim 4, further comprising a plane mirror positioned between the interferometer and one of the pair of opposable mirrors to facilitate measurement of the object.

6. The micrometer of claim 1, further comprising an adjustable spring to close the pair of lenses to immobilize the object.

7. The micrometer of claim 1, further comprising a micrometer drive to open the pair of lenses to free the object.

8. The micrometer of claim 1, further comprising a sensor to facilitate correction to a measurement based on one or more environmental factors.

9. A method of object measurement comprising:
 facilitating positioning of an object between a pair of opposable lenses at a desired position and angle;
 enabling viewing of the object using a microscope via the pair of lenses and one or more mirrors;
 facilitating acquisition of at least one measurement of the object using an interferometer; and
 providing an output based on the measurement.

10. The method of claim 9, wherein the interferometer comprises a laser interferometer.

11. The method of claim 9, wherein the pair of opposable lenses comprises a fixed lens and a movable lens.

12. The method of claim 9, wherein positioning is facilitated in part using a goniometer to angularly position the object with respect to the pair of lenses.

13. The method of claim 9, wherein measurement of the object is facilitated in part using a plane mirror positioned between the optical measurement device and one of the one or more mirrors.

14. The method of claim 9, wherein an adjustable spring facilitates positioning of the object by moving one lens of the pair closer to the other lens of the pair of lenses to immobilize the object.

15. The method of claim 9, wherein a micrometer drive facilitates positioning of the object by moving one lens of the pair away from the other lens of the pair of lenses to free the object.

16. The method of claim 9, wherein viewing of the object is enabled via a microscope arranged with respect to the lenses and mirrors.

17. The method of claim 9, further comprising facilitating correction of a measurement, using a processor, based on one or more environmental factors obtained via sensor data.

18. An optical contact micrometer comprising:
 a pair of lenses to receive an object and immobilize the object in a position, the pair of lenses to be positioned on opposite sides of an opening to receive the object, the pair of lenses including a movable lens and a fixed lens, the movable lens contacting the object to immobilize the object against the fixed lens;
 a pair of opposable mirrors positioned at an angle with respect to the pair of lenses to facilitate viewing of the object through the lenses;
 a microscope to facilitate viewing of the object through the lenses via the mirrors; and
 a laser interferometer to obtain one or more measurements of the object.

19. The micrometer of claim 18, wherein the laser interferometer is driven using a multi-frequency laser to obtain measurements based on reflections from the object.

20. The micrometer of claim 18, further comprising an adjustable spring to close the pair of lenses to immobilize the object and a micrometer drive to open the pair of lenses to free the object.

* * * * *